(12) United States Patent
Okamoto (10) Patent No.: US 10,618,846 B2
(45) Date of Patent: Apr. 14, 2020

(54) DIELECTRIC PORCELAIN COMPOSITION, MULTILAYER CERAMIC CAPACITOR, AND METHOD FOR PRODUCING MULTILAYER CERAMIC CAPACITOR

(71) Applicant: Murata Manufacturing Co., Ltd., Nagaokakyo-shi, Kyoto-fu (JP)

(72) Inventor: Takafumi Okamoto, Nagaokakyo (JP)

(73) Assignee: MURATA MANUFACTURING CO., LTD., Nagaokakyo-Shi, Kyoto-Fu (JP)

(*) Notice: Subject to any disclaimer, the term of this patent is extended or adjusted under 35 U.S.C. 154(b) by 0 days.

(21) Appl. No.: 15/988,405

(22) Filed: May 24, 2018

(65) Prior Publication Data

US 2018/0265413 A1  Sep. 20, 2018

Related U.S. Application Data

(63) Continuation of application No. PCT/JP2016/085894, filed on Dec. 2, 2016.

(30) Foreign Application Priority Data

Dec. 4, 2015 (JP) .................... 2015-237371

(51) Int. Cl.
*C04B 35/46* (2006.01)
*C04B 35/468* (2006.01)
(Continued)

(52) U.S. Cl.
CPC ........ *C04B 35/4682* (2013.01); *C04B 35/638* (2013.01); *H01G 4/12* (2013.01);
(Continued)

(58) Field of Classification Search
CPC .............. C04B 35/4682; C04B 35/638; C04B 2235/652; C04B 2235/6584;
(Continued)

(56) References Cited

U.S. PATENT DOCUMENTS 7,189,673 B2 * 3/2007 Okimura .............. C01G 23/002
501/136
2006/0068983 A1 * 3/2006 Okimura .............. C01G 23/002
501/136
(Continued)

FOREIGN PATENT DOCUMENTS

JP S5567567 A 5/1980
JP 2002029835 A 1/2002
(Continued)

OTHER PUBLICATIONS

International Search Report issued for PCT/JP2016/085894, dated Jan. 24, 2017.
(Continued)

*Primary Examiner* — Noah S Wiese
(74) *Attorney, Agent, or Firm* — Arent Fox LLP (57) ABSTRACT

A dielectric porcelain composition having a main component a perovskite compound represented by $ABO_3$, and the perovskite compound at least contains Ti and a volatile element which forms a solid solution at a B site, and may also contain Zr. The dielectric porcelain composition contains the volatile element in an amount larger than 0 part by mol and less than or equal to 0.2 part by mol with respect to 100 parts by mol of a total of the Ti and the Zr, and has a ratio of an A-site element to the total of the Ti and the Zr of 1.00 or more and 1.04 or less as a molar ratio.

10 Claims, 1 Drawing Sheet

(51) Int. Cl.
*H01G 4/30* (2006.01)
*H01G 4/12* (2006.01)
*C04B 35/638* (2006.01)

(52) U.S. Cl.
CPC ............. *H01G 4/1227* (2013.01); *H01G 4/30* (2013.01); *C04B 2235/3206* (2013.01); *C04B 2235/3208* (2013.01); *C04B 2235/3213* (2013.01); *C04B 2235/3217* (2013.01); *C04B 2235/3224* (2013.01); *C04B 2235/3225* (2013.01); *C04B 2235/3239* (2013.01); *C04B 2235/3262* (2013.01); *C04B 2235/3281* (2013.01); *C04B 2235/3284* (2013.01); *C04B 2235/3286* (2013.01); *C04B 2235/3293* (2013.01); *C04B 2235/3294* (2013.01); *C04B 2235/3418* (2013.01); *C04B 2235/652* (2013.01); *C04B 2235/6584* (2013.01); *C04B 2235/6588* (2013.01); *C04B 2235/70* (2013.01)

(58) Field of Classification Search
CPC .... C04B 2235/3225; C04B 2235/3217; C04B 2235/3281; C04B 2235/3262; C04B 2235/3284; C04B 2235/3206; C04B 2235/3293; C04B 2235/3239; C04B 2235/3208; C04B 2235/6588; C04B 2235/3418; C04B 2235/3286; C04B 2235/3224; C04B 2235/3213; C04B 2235/3294; C04B 2235/70; H01G 4/1227; H01G 4/23; H01G 4/30
See application file for complete search history.

(56) References Cited

U.S. PATENT DOCUMENTS

| | | |
|---|---|---|
| 2009/0207551 A1 | 8/2009 | Suzuki |
| 2011/0234364 A1* | 9/2011 | Abe ........................ C04B 35/46 338/22 SD |
| 2013/0037904 A1* | 2/2013 | Shimada ............. C04B 35/4682 257/467 |
| 2014/0133064 A1* | 5/2014 | Ahn ........................ H01G 4/30 361/303 |

FOREIGN PATENT DOCUMENTS

| | | | |
|---|---|---|---|
| JP | 2012046372 A * | 3/2012 | ........... C04B 35/468 |
| JP | 2012046372 A | 3/2012 | |
| JP | 2012193096 A | 10/2012 | |
| WO | 2008068999 A1 | 6/2008 | |

OTHER PUBLICATIONS

Written Opinion of the International Searching Authority issued for PCT/JP2016/085894, dated Jan. 24, 2017.

* cited by examiner

DIELECTRIC PORCELAIN COMPOSITION, MULTILAYER CERAMIC CAPACITOR, AND METHOD FOR PRODUCING MULTILAYER CERAMIC CAPACITOR

CROSS REFERENCE TO RELATED APPLICATIONS

The present application is a continuation of International application No. PCT/JP2016/085894, filed Dec. 2, 2016, which claims priority to Japanese Patent Application No. 2015-237371, filed Dec. 4, 2015, the entire contents of each of which are incorporated herein by reference.

FIELD OF THE INVENTION

The present invention relates to a dielectric porcelain composition, a multilayer ceramic capacitor, and a method for producing the multilayer ceramic capacitor, and more specifically to a dielectric porcelain composition aimed at ensuring satisfactory reliability even when fired in a reducing atmosphere, a multilayer ceramic capacitor using this dielectric porcelain composition, and a method for producing the multilayer ceramic capacitor.

BACKGROUND OF THE INVENTION

In recent years, a multilayer ceramic capacitor is used in various electronic devices. As a dielectric material for this type of multilayer ceramic capacitor, conventionally, a $BaTiO_3$-based compound allowing a high dielectric constant is widely used. Furthermore, as a material for an internal electrode of such a multilayer ceramic capacitor, a base metal material such as Ni having good conductivity at a low cost is widely used.

For example, Patent Document 1 proposes a barium titanate-based dielectric porcelain composition represented by the composition formula $\{(Ba_{1-x-y}Ca_xSr_y)O\}_m \cdot TiO_2$, where $1.005 \leq m \leq 1.03$, $0.02 \leq x \leq 0.22$, and $0.05 \leq y \leq 0.35$.

Further, Patent Document 1 describes a method for producing a multilayer ceramic capacitor, comprising the steps of: producing a green sheet composed of sintered ceramic having a prescribed composition; forming on the ceramic green sheet a conductive layer of nickel, iron, cobalt or an alloy thereof to serve as an internal electrode and stacking such ceramic green sheets in layers; firing the stack at a temperature range of 1200 to 1330° C. in a reducing atmosphere containing 1-5% by volume of hydrogen; and forming at a fired ceramic end surface an external electrode electrically conducting with the internal electrode exposed at the ceramic end surface.

Patent Document 1 describes that a perovskite compound having a portion of Ba substituted with Ca and Sr, respectively, and represented by the general formula $A_mBO_3$ has a value of m (=A/B) rendered A-site rich and is fired in a reducing atmosphere allowing a material of the internal electrode to be unoxidized to provide a multilayer ceramic capacitor having a specific resistance of $10^6$ MΩ or more and a dielectric constant ε of 5000 or more.

PTD 1: Japanese Patent Laying-Open No. 55-67567 (see Claims 1 and 2, page 3, Table 1, etc.)

SUMMARY OF THE INVENTION

However, in Patent Document 1, while a specific resistance of $10^6$ MΩ or more is ensured in an initial stage of driving and reduction in insulation resistance can be suppressed at a temperature of about 85° C. even for continuous driving for 1000 hours, continuous driving for a long period of time at a high temperature of 150° C. or higher decreases insulation resistance and thus invites deterioration of insulation performance, and sufficient reliability is thus not ensured.

That is, it has been known that when a ceramic material of a perovskite-type crystal structure such as a $BaTiO_3$-based compound is fired in a reducing atmosphere, an oxygen defect is caused in a crystal lattice. Since such oxygen defect migrates and thus diffuses within a crystal grain while driving, continuous driving for a long period of time at high temperature impairs insulation performance over time and accordingly, invites reduction in high-temperature load lifetime, and sufficient reliability is not ensured.

The present invention has been made in view of such circumstances, and it is an object of the present invention to provide a dielectric porcelain composition that can suppress degradation of insulation performance over time even when fired in a reducing atmosphere and ensures satisfactory reliability, a multilayer ceramic capacitor using this dielectric porcelain composition, and a method for producing the multilayer ceramic capacitor.

As has been discussed above, it has been known that when a ceramic material having a perovskite-type crystal structure (general formula: $ABO_3$) such as $BaTiO_3$ is fired in a reducing atmosphere, an oxygen defect (oxygen vacancy) is caused in a crystal lattice. And such oxygen defect migrates and thus diffuses within a crystal grain and thus invites degradation of insulation performance over time. Accordingly, to suppress degradation of insulation performance over time to increase reliability, it is necessary to suppress diffusion of the oxygen defect.

In order to suppress diffusion of an oxygen defect, forming a vacancy at a B site where Ti is coordinated is considered to be effective.

However, simply reducing a Ti content in molar amount with respect to an A-site element content in molar amount does not allow a resultant dielectric porcelain composition to be dense even if a vacancy is formed at a B site, and it is thus difficult to achieve a desired dielectric property.

The present inventor has conducted a diligent study from such a viewpoint, and as a result found that a specific molar ratio between an A-site element and Ti, and also causing a volatile element to form a solid solution at a B site in a form of substituting a portion of Ti, and thereafter applying a heat source in a reducing atmosphere to volatilize the volatile element to allow the volatile element to fall within a prescribed range, can suppress degradation of insulation performance over time and increase reliability. Moreover, it has also been found that a similar effect can be obtained when a portion of Ti is substituted with Zr.

The present invention has been made based on such findings, and a dielectric porcelain composition according to the present invention includes a main component composed of a perovskite type compound represented by a general formula of $ABO_3$, and the perovskite type compound at least contains Ti and a volatile element which forms a solid solution at a B site, and also may optionally contain Zr, the volatile element being contained in an amount larger than 0 part by mol and less than or equal to 0.2 part by mol with respect to 100 parts by mol of a total of the Ti and the Zr, and a ratio of an A-site element to the total of the Ti and the Zr is 1.00 or more and 1.04 or less as a molar ratio.

Preferably, the dielectric porcelain composition of the present invention is such that the volatile element includes at least one selected from Zn, Sn, Sb, and In.

Further, preferably, the dielectric porcelain composition of the present invention is such that the A-site element includes at least one selected from Ba, Ca and Sr.

Further, preferably, the dielectric porcelain composition of the present invention contains as a sub component of at least one selected from a rare earth element, a transition metal element, and Si.

Further, preferably, the dielectric porcelain composition of the present invention is such that the rare earth element is at least one selected from Gd, Dy, and Y.

Further, preferably, the dielectric porcelain composition of the present invention is such that the transition metal element is at least one selected from Mg, Al, Mn, Cu, and V.

Furthermore, a multilayer ceramic capacitor according to the present invention includes a ceramic sintered compact having a plurality of dielectric layers and a plurality of internal electrodes deposited alternately, the internal electrodes being formed of a base metal material and the dielectric layers being formed of any one of the above dielectric porcelain compositions.

Further, the multilayer ceramic capacitor can be produced as follows: a ceramic raw material powder including a main component powder having a portion of Ti substituted with a volatile element is prepared, and the volatile element is volatilized when a ceramic material and an internal electrode material are fired simultaneously.

That is, a method for producing a multilayer ceramic capacitor according to the present invention comprises: preparing a ceramic raw material at least including a Ti compound and a compound containing a volatile element, and optionally containing a Zr compound; calcining the ceramic raw material in air to synthesize a perovskite type compound represented by a general formula of $ABO_3$, with the volatile element forming a solid solution at a B site of the perovskite type compound to form a main component powder; preparing a ceramic slurry from the main component powder; shaping the ceramic slurry to produce a ceramic green sheet; using a conductive paste containing a base metal material as a main component to form a conductive film of a prescribed pattern on the ceramic green sheet; stacking a plurality of the ceramic green sheets each having the conductive film formed thereon to produce a multilayer shaped body; and firing the multilayer shaped body in a reducing atmosphere to produce a ceramic sintered compact such that the ceramic sintered compact has a main component containing the volatile element in an amount larger than 0 part by mol and less than or equal to 0.2 part by mol with respect to 100 parts by mol of a total of the Ti and the Zr, and a ratio of an A-site element to the total of the Ti and the Zr of 1.00 or more and 1.04 or less as a molar ratio.

Further, preferably, the method of producing a multilayer ceramic capacitor of the present invention is such that a ratio of the volatile element in the main component of the ceramic sintered compact to the volatile element in the main component powder is 0.4 or less as a molar ratio.

When the volatile element is volatilized in the firing step in a reducing atmosphere, a more strongly reducing atmosphere facilitates volatilizing the volatile element.

That is, in the method for producing a multilayer ceramic capacitor of the present invention, it is preferable that the reducing atmosphere is a strongly reducing atmosphere.

Further, as a method for volatilizing the volatile element, after a main component powder at least containing Ti and the volatile element has once been synthesized, the main component powder may be heated in a reducing atmosphere to volatilize the volatile element, or before the firing step an additional heat treatment may be performed to volatilize the volatile element.

That is, the method for producing a multilayer ceramic capacitor of the present invention further comprises a heat treatment step of subjecting the main component powder to a heat treatment in a reducing atmosphere, and it is also preferable that the heat treatment step be performed before the firing step is performed.

Preferably, the method for producing a multilayer ceramic capacitor of the present invention is such that the volatile element includes at least one selected from Zn, Sn, Sb, and In.

Further, it is also preferable that a sub component such as a rare earth element compound, a transition metal compound and a Si compound be added to the main component powder.

That is, it is also preferable that the method for producing a multilayer ceramic capacitor of the present invention be such that the slurry preparation step adds a sub component to the main component powder, and in that case, it is preferable that the subcomponent include at least one of a rare earth compound, a transition metal compound, and a Si compound.

The dielectric porcelain composition according to the present can thus suppress degradation of insulation performance over time even in a case of continuous driving for a long period of time at high temperature and thus ensures satisfactory reliability.

Furthermore, the multilayer ceramic capacitor according to the present invention can have satisfactory high-temperature load lifetime and hence high reliability.

Furthermore, the method for producing a multilayer ceramic capacitor of the present invention results in a multilayer ceramic capacitor which, even in a case of continuous driving for a long period of time, can minimize degradation of insulation performance over time and thus has a satisfactory high-temperature load lifetime and hence a high reliability.

DETAILED DESCRIPTION OF THE PREFERRED EMBODIMENTS

Figure 1:
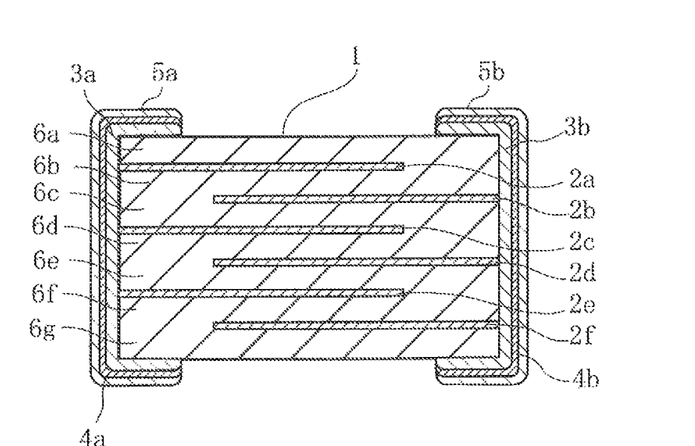
The FIGURE is a cross-sectional view schematically showing one embodiment of a multilayer ceramic capacitor fabricated by using the dielectric porcelain composition of the present invention.

Hereinafter, an embodiment of the present invention will be described in detail.

A dielectric porcelain composition as one embodiment of the present invention has a main component composed of a perovskite type compound represented by a general formula of $ABO_3$. And the perovskite type compound at least contains Ti and a volatile element which forms a solid solution at a B site.

While the volatile element is not particularly limited in so far as it is an element which forms a solid solution at a B site in a form of substituting a portion of Ti, it is preferable to use an element having a low melting point and an ionic radius approximate to that of Ti and thus easily substituting Ti, e.g., at least one selected from Zn, Sn, Sb and In, and among these, Zn is preferably used as it is inexpensive.

Furthermore, while the A-site element that forms the perovskite-type compound is also not particularly limited in so far as it serves as a main element of a dielectric material, normally it is preferable to use at least one selected from Ba, Ca, and Sr, and among these, Ba may be preferably used as it has a particularly satisfactory dielectric property.

The B-site element is only required to at least contain Ti and a volatile element, as has been set forth above, and may contain a tetravalent element of Zr, as required.

Accordingly, the perovskite-type compound, with the volatile element represented as E, can include $Ba(Ti, E)O_3$, $Ba(Ti, Zr, E)O_3$, $(Ba, Sr, Ca)(Ti, E)O_3$, $(Ba, Ca, Sr)(Ti, Zr, E)O_3$ and the like.

The present dielectric porcelain composition contains the volatile element in an amount set to be larger than 0 part by mol and less than or equal to 0.2 part by mol with respect to 100 parts by mol of a total of the Ti and the Zr, and has a ratio of an A-site element to the total of the Ti and the Zr (hereinafter an "A/(Ti+Zr) ratio") set to 1.00 to 1.04 as converted into a molar ratio, A dielectric porcelain composition can thus be obtained which, even in a case of continuous driving for a long period of time at high temperature, can suppress degradation of insulation performance over time and thus has a satisfactory high-temperature load lifetime and hence high reliability.

Furthermore, when a base metal material such as Ni is used as an internal electrode material of the multilayer ceramic capacitor, and the internal electrode material and a ceramic green sheet are co-fired, it is necessary to fire them in a reducing atmosphere to prevent the internal electrode material from being oxidized.

However, as has been discussed herein above, when a Ti-containing perovskite-type compound is fired in a reducing atmosphere, a vacancy is caused in a crystal lattice at a location where oxygen is coordinated, and an oxygen defect is thus caused. The oxygen defect diffuses throughout a crystal grain, and invites degradation of insulation performance over time in a case of continuous driving for a long period of time at high temperature and may impair reliability.

In order to suppress oxygen defect diffusion, forming a vacancy at a B site where Ti is coordinated is considered to be effective. However, simply reducing a Ti content in molar amount with respect to an A-site element content in molar amount does not allow a resultant dielectric porcelain composition to be dense even if a vacancy is formed at a B site, and it is thus difficult to achieve a desired dielectric property. The same applies to a case having a solid solution of Zr at a B site in addition to that of Ti.

Accordingly, the present inventor has diligently conducted a study and as a result found that when a perovskite type compound having a portion of Ti substituted with a prescribed amount of a volatile element is fired in a reducing atmosphere to volatilize the volatile element, degradation of insulation performance over time can be suppressed even in a case of continuous driving for a long period of time at high temperature and satisfactory reliability can be obtained. A reason for this is presumed as follows:

It is believed that when a ceramic raw material including a solid solution of a volatile element at a B site is fired in a reducing atmosphere to volatilize the volatile element, a vacancy (a B-site vacancy) is formed at a position where the volatile element has volatilized. The B-site vacancy functions to suppress migration and diffusion of an oxygen defect formed in a firing treatment in a reducing atmosphere, as has been described above. Accordingly, by volatilizing the volatile element by a firing treatment, a B-site vacancy can be formed and oxygen defect migration and diffusion can be suppressed. As a result it is believed that even in a case of continuous driving for a long period of time at a high temperature of 150° C. or higher, degradation of insulation performance over time can be suppressed and reliability can be increased.

Hereinafter, a ground for setting the volatile element's content and the A/(Ti+Zr) ratio to the above indicated ranges will be described in detail.

(1) Content of Volatile Element

As has been set forth above, in synthesizing a main component powder, a volatile element which forms a solid solution at a B site is previously contained in a form of substituting a portion of Ti and a firing treatment is performed in a reducing atmosphere to volatilize the volatile element, which can suppress degradation of insulation performance over time even in a case of continuous driving for a long period of time at high temperature and thus contemplate satisfactory reliability.

However, when the volatile element is contained in an amount exceeding 0.2 part by mol with respect to 100 parts by mol of a total of Ti and Zr, the volatile element excessively remains at a B-site, and as the volatile element volatilizes in a small amount, a sufficient high-temperature load lifetime cannot be obtained and it is thus difficult to ensure reliability as desired.

Accordingly, in the present embodiment, the volatile element is contained in an amount larger than 0 part by mol and less than or equal to 0.2 part by mol with respect to 100 parts by mol of the total of the Ti and the Zr.

Note that if the volatile element contained in the dielectric porcelain composition forms a solid solution at an A site or is contained as a sub component and exists at a grain boundary, volatilizing the volatile element cannot solve the issue to be addressed by the present invention. It is believed that this is because the volatile element is not dissolved in a B site and a B-site vacancy having an oxygen defect diffusion suppressing effect cannot be formed. Accordingly, in the present invention, it is important that the volatile element forms a solid solution at a B site within the range described above.

(2) A/(Ti+Zr) Ratio

While a perovskite type compound has a ratio of an A-site element to a B-site element (an A/B ratio) of 1.000 as represented by a stoichiometric ratio, the A/B ratio is not limited to a stoichiometric ratio.

However, when in the B-site element a ratio of the A site element to a total of Ti and Zr excluding the volatile element i.e., an A/(Ti+Zr) ratio, is less than 1.00, the total of Ti and Zr will be stoichiometrically excessive as compared with the A-site element, and if the volatile element is volatilized, it is difficult to obtain high reliability as desired.

On the other hand, if the A/(Ti+Zr) ratio exceeds 1.04, the compound will be excessively A-site rich and it is difficult to obtain a dense sintered compact.

Accordingly, in the present embodiment, the A/(Ti+Zr) ratio is set to 1.00 or more and 1.04 or less.

The present dielectric porcelain composition is only required to have a main component (for example, more than 50 wt %, preferably 80 wt % or more, more preferably 90 wt % or more) composed of the above-described perovskite type compound, and it is also preferable that the dielectric porcelain composition contain various sub components, such as a rare earth element, a transition metal element, Si, etc., in a range which does not affect properties. In that case, for example, the rare earth element can be Gd, Dy, Y, etc., and the transition metal element can be Mg, Al, Mn, Cu, V, etc.

Note that it is not preferable to have a solid solution of the rare-earth element, transition metal element, etc. in the main component. For example, having a solid solution of the rare earth element in the main component requires having a solid solution of an acceptor element such as Mg in the main component together with the rare earth element in order to ensure reduction resistance. However, Mg is highly ionic for Ti, and forming a solid solution of Mg in the main component results in a reduced Curie temperature and may thus invite a reduced relative dielectric constant at high temperature unpreferably.

Hereinafter, a multilayer ceramic capacitor of the present invention will be described in detail.

The FIGURE is a schematic cross-sectional view showing one embodiment of a multilayer ceramic capacitor fabricated by using the dielectric porcelain composition of the present invention.

In the multilayer ceramic capacitor, internal electrodes 2a to 2f are buried in a ceramic sintered compact 1, external electrodes 3a and 3b are formed at opposite ends of ceramic sintered compact 1, and first plating films 4a and 4b and second plating films 5a and 5b are formed on surfaces of external electrodes 3a and 3b.

That is, ceramic sintered compact 1 is formed by alternately stacking and firing dielectric layers 6a to 6g formed of the dielectric porcelain composition of the present invention and internal electrodes 2a to 2f, and internal electrodes 2a, 2c and 2e are electrically connected to external electrode 3a and internal electrodes 2b, 2d and 2f are electrically connected to external electrode 3b. Internal electrodes 2a, 2c, 2e have surfaces opposite to those of internal electrodes 2b, 2d, 2f, respectively, and electrostatic capacitance is formed between these opposite surfaces.

Hereinafter, a method for producing the above multilayer ceramic capacitor will be described in detail.

Initially, as ceramic raw materials, a Ba compound, a Ti compound, and a volatile compound containing a volatile element are prepared, and a Zr compound is prepared as required. Subsequently, these ceramic raw materials are weighed, and charged into a ball mill together with a grinding medium, such as PSZ (Partially Stabilized Zirconia) balls, and pure water, mixed and ground sufficiently in a wet manner, dried and thereafter calcined at 900 to 1100° C. for a prescribed period of time to produce a main component powder.

Subsequently, a sub component such as a rare earth compound, a transition metal compound, an Si compound, etc. is prepared and weighed by a prescribed amount. Subsequently, these weighed materials were charged into a ball mill together with the main component powder, a grinding medium and pure water, sufficiently wet mixed and thus ground, and dried to produce a ceramic raw material powder.

Subsequently, the ceramic raw material powder is charged into a ball mill together with an organic binder, an organic solvent and a grinding medium and wet-mixed to prepare a ceramic slurry, which is in turn shaped through a RIP process, a doctor blade process, or the like to prepare a ceramic green sheet to have a thickness of about 2 m or less after it is fired.

Subsequently, a conductive paste for the internal electrodes which contains a base metal material such as Ni is prepared. Subsequently, the conductive paste for the internal electrodes is used to provide screen-printing on the ceramic green sheet to form a conductive film of a predetermined pattern on a surface of the ceramic green sheet.

Subsequently, a plurality of such ceramic green sheets each having the conductive film formed thereon are stacked in a predetermined direction and a ceramic green sheet which does not have the conductive film formed thereon is placed as a topmost layer, and the ceramic green sheets are compressed together and cut to have a predetermined dimension to thus produce a multilayer shaped body.

Thereafter, the multilayer shaped body is subjected to a heat treatment in the air at 250 to 350° C. to have the binder burnt and thus removed therefrom, and furthermore, the multilayer shaped body is fired in a reducing atmosphere of gaseous $H_2$—$N_2$—$H_2O$ at 1200 to 1300° C. for about 2 hours. Thus the conductive film and the ceramic green sheets are co-sintered, and ceramic sintered compact 1 having internal electrodes 2a to 2f buried therein is obtained and the volatile element is also moderately volatilized. Specifically, ceramic sintered compact 1 can be obtained which contains the volatile element in an amount set to be larger than 0 part by mol and less than or equal to 0.2 part by mol with respect to 100 parts by mol of a total of the Ti and the Zr and has an A/(Ti+Zr) ratio of 1.00 or more and 1.04 or less.

While the amount of the volatile element volatilized is not particularly limited in so far as the content of the volatile element and the A/(Ti+Zr) ratio satisfy the ranges indicated above, preferably, a ratio of the volatile element in the main component of the ceramic sintered compact to the volatile element in the main component powder is 0.4 or less as converted into a molar ratio. That is, when the ratio exceeds 0.4, the volatile element volatilizes in a small amount and it may be difficult to obtain sufficient reliability. However, even in a case with the ratio having a value of 0.4 or less, it is difficult to obtain desired high reliability when the content of the volatile element, the A/(Ti+Zr) ratio, etc. depart from the ranges indicated above. Accordingly, in the present invention, in any case, it is important that the content of the volatile element, the A/(Ti+Zr) ratio, etc. satisfy the ranges indicated above.

A firing treatment in a more reducing atmosphere can facilitate volatilizing the volatile element, and accordingly, for example performing the firing treatment in a strongly reducing atmosphere with an oxygen partial pressure of $10^{-11}$ to $10^{-14}$ MPa is preferable.

Subsequently, a conductive paste for the external electrodes is applied to opposite end surfaces of ceramic sintered compact 1 and baked at 600 to 800° C. to form external electrodes 3a and 3b.

The conductive paste for the external electrodes contains a conductive material, which is also not particularly limited, although from the viewpoint of cost reduction a material containing Ag, Cu, or an alloy thereof as a main component is preferably used.

External electrodes 3a and 3b may be formed in a method as follows: the conductive paste for the external electrodes is applied to the opposite end surfaces of the multilayer shaped body and fired together with the multilayer shaped body simultaneously.

Finally, electrolytic plating is performed to form first plating films 4a, 4b made of Ni, Cu, a Ni—Cu alloy or the like on the surfaces of external electrodes 3a, 3b, and furthermore, second plating films 5a, 5b made of solder, tin, or the like are formed on the surfaces of first plating films 4a, 4b to thus produce a multilayer ceramic capacitor.

Thus, according to the present production method, when firing in a reducing atmosphere causes an oxygen defect in a crystal grain, a volatile element in a main component powder is volatilized in the firing treatment in the reducing atmosphere, and a multilayer ceramic capacitor can thus be obtained which even in a case of driving continuously for a long period of time can minimize degradation of insulation performance over time and has a satisfactory high-temperature load lifetime and hence high reliability.

It should be noted that the present invention is not limited to the above embodiment. While in the above embodiment the volatile element is volatilized in a strongly reducing atmosphere simultaneously when the multilayer shaped body is fired, the volatile element may be volatilized in any step of the production process in a reducing atmosphere by heating the main component powder. Accordingly, for example, a main component powder prepared with a solid solution of the volatile element formed at a B site may be subjected to an additional heat treatment in a reducing atmosphere of gaseous $N_2$—$H_2$ to volatilize the volatile element before the firing treatment. In that case, it is unnecessary to volatilize the volatile element in the originally set firing treatment, and the firing treatment can be performed in a weakly reducing atmosphere with an oxygen partial pressure allowing a base metal material to be unoxidized, e.g., about $10^{-9}$ to $10^{-10}$ MPa.

The ceramic raw materials such as a Ba compound and a Ti compound can also be appropriately selected, such as carbonate, oxide, nitrate, hydroxide, organic acid salt, alkoxide, a chelate compound, etc., depending on the form of the synthesis reaction.

Furthermore, the method for synthesizing the main component powder is not limited to the above-mentioned solid phase method, either, and a synthesis method such as a coprecipitation method, a hydrothermal method, an oxalic acid method, etc. may be used.

ratio of Ba to Ti (hereinafter referred to as a "Ba/Ti ratio") had values as shown in Table 1. Subsequently, these weighed materials were charged into a ball mill together with PSZ balls and pure water, sufficiently wet mixed and thus ground, and dried, and thereafter calcined at 1050° C. for about 2 hours in the air to produce a main component powder.

Subsequently, as sub component powders, $Gd_2O_3$, $Dy_2O_3$, $Y_2O_3$, MgO, $Al_2O_3$, $MnCO_3$, CuO, $V_2O_5$, ZnO, and $SiO_2$ were prepared. Subsequently, these sub component powders were weighed to allow a ceramic raw material powder to contain the sub component powders in an amount in parts by mol, as indicated in Table 1, with respect to 100 parts by mol of Ti, and wet-mixed in a ball mill and thereafter dried to obtain ceramic raw material powders for sample Nos. 1-19.

The ceramic raw material powders of Sample Nos. 1 to 19 had their compositions analyzed through ICP-AES (high frequency inductively coupled plasma emission spectrometry) and XRF (X-ray fluorescence spectrometry) to calculate Zn(1) and Mg in parts by mol with respect to 100 parts by mol of Ti and a Ba/Ti ratio. Note that in Example 1, a Zn content after the main component powder is synthesized is indicated as Zn(1), and a Zn content in a main component of a ceramic sintered compact, which will be described later, is indicated as Zn(2).

Table 1 shows a result of such measurement, and it has been confirmed that each ceramic raw material powder had a component composition substantially equal to an amount charged.

TABLE 1

| | | | Content relative to 100 parts by mol of Ti (in parts by mol) | | | | | | | | | | |
|---|---|---|---|---|---|---|---|---|---|---|---|---|---|
| sample | Ba/Ti ratio | main component | | | | sub component | | | | | | | |
| Nos. | (-) | Zn(1) | Mg | Gd | Dy | Y | Mg | Al | Mn | Cu | V | Zn | Si |
| 1* | 0.98 | 0.15 | 0.0 | — | — | — | — | — | 0.50 | — | — | −1.0 | 1.0 |
| 2 | 1.00 | 0.15 | 0.0 | — | — | — | — | — | 1.2 | — | — | — | 1.0 |
| 3 | 1.02 | 0.15 | 0.0 | — | — | — | — | — | 1.2 | — | — | — | 1.0 |
| 4 | 1.04 | 0.15 | 0.0 | — | — | — | — | — | 1.2 | — | — | — | 1.0 |
| 5* | 1.06 | 0.15 | 0.0 | — | — | — | — | — | 1.2 | — | — | — | 1.0 |
| 6* | 1.01 | 0.0 | 0.0 | — | — | — | — | — | 0.75 | — | — | — | 1.0 |
| 7 | 1.01 | 0.15 | 0.0 | — | — | — | — | — | 0.75 | — | — | — | 1.0 |
| 8 | 1.01 | 0.45 | 0.0 | — | — | — | — | — | 0.75 | — | — | — | 1.0 |
| 9 | 1.01 | 1.0 | 0.0 | — | — | — | — | — | 1.0 | — | — | — | 1.0 |
| 10* | 1.01 | 2.0 | 0.0 | — | — | — | — | — | 1.0 | — | — | — | 1.0 |
| 11* | 1.01 | 0.0 | 0.45 | — | — | — | — | — | 1.0 | — | — | — | 1.0 |
| 12 | 1.01 | 0.20 | 0.0 | 0.50 | — | — | 0.50 | — | — | — | — | — | — |
| 13 | 1.01 | 0.20 | 0.0 | — | 1.00 | — | 0.50 | — | — | — | — | — | — |
| 14 | 1.01 | 0.30 | 0.0 | — | — | 1.00 | 0.50 | — | — | — | — | — | — |
| 15 | 1.02 | 0.30 | 0.0 | — | — | — | — | — | 1.0 | 0.10 | — | — | 1.5 |
| 16 | 1.02 | 0.30 | 0.0 | — | — | — | — | — | 1.0 | — | 0.10 | — | 1.5 |
| 17 | 1.02 | 0.15 | 0.0 | — | — | 0.50 | — | 0.30 | 1.0 | — | — | — | 2.0 |
| 18 | 1.01 | 0.15 | 0.0 | 0.50 | — | — | — | — | 1.0 | — | — | — | 2.0 |
| 19* | 1.01 | 0.0 | 0.0 | — | — | — | — | — | 0.50 | — | — | 0.30 | 1.0 |

*departing from the scope of the present invention

Hereinafter, examples of the present invention will be described in detail.

Example 1

[Preparing Samples]

$BaCO_3$, $TiO_2$, ZnO, and $MgCO_3$ were prepared as ceramic raw materials and weighed such that after the weighed materials had been synthesized, Zn and Mg in parts by mol with respect to 100 parts by mol of Ti, and a molar Subsequently, each ceramic raw material powder was charged into a ball mill together with ethanol, a polyvinyl butyral based binder, etc., a plasticizer, and PSZ balls, and wet-mixed to prepare a ceramic slurry. Subsequently, the ceramic slurry was shaped through a doctor blade process so as to have a thickness of 2.0 m after fired to thus produce a ceramic green sheet.

Subsequently, a conductive paste for the internal electrodes which contained Ni powder as a main component was prepared. Subsequently, the conductive paste for the internal electrodes was used to provide screen-printing on the ceramic green sheet to form a conductive film of a predetermined pattern on a surface of the ceramic green sheet.

Subsequently, a prescribed number of such ceramic green sheets each having the conductive film formed thereon were stacked and a ceramic green sheet which did not have the conductive film formed thereon was placed as a topmost layer, and the ceramic green sheets were compressed together and cut to have a predetermined dimension to thus produce a multilayer shaped body. Thereafter, the multilayer shaped body was heated in the air at 350° C. for 3 hours to have the binder removed therefrom. Subsequently, a firing treatment was performed at 1200 to 1300° C. for 2 hours in a reducing atmosphere of gaseous $H_2$—$N_2$—$H_2O$ with an oxygen partial pressure controlled to be $10^{-11.5}$ to $10^{-14}$ MPa to co-sinter the conductive film and the ceramic green sheets to provide a ceramic sintered compact having dielectric layers and internal electrodes deposited alternately.

The ceramic sintered compacts of Sample Nos. 1 to 19 were subjected to a structural analysis in an XRD method (X-ray diffraction method), and it has been confirmed that the ceramic sintered compacts all had a barium titanate-based perovskite type crystal structure.

Furthermore, the ceramic sintered compacts of Sample Nos. 1 to 19 were each dissolved and analyzed through ICP-AES (Inductively Coupled Plasma-Emission Spectroscopy), and it has been confirmed that the component of Zn in the main component as compared with the component of Zn in the ceramic raw material powder was reduced by 80-90% as converted into a molar ratio. It is believed that this is probably because Zn has been volatilized through the firing treatment. Note that the Ba/Ti ratio and the content of the sub component were substantially the same as those of a result of measuring the ceramic raw material powder, except for the Zn of Sample No. 19.

Further, the ceramic sintered compacts of Sample No. 1 to 19 were observed through TEM-EDX (transmission electron microscope energy dispersive X-ray spectroscopy) and it has been confirmed that Zn was absent at least at a center portion of a crystal grain.

Subsequently, a conductive paste containing Cu powder and glass frit for external electrodes was applied to opposite end surfaces of the ceramic sintered compacts and baked at 800° C. in a nitrogen atmosphere to form external electrodes to thus produce sample Nos. 1-19.

The obtained samples each had a dielectric layer having a thickness of 2.0 μm, an internal electrode having a thickness of 0.6 m, and an external dimension of 3.2 mm in length, 1.6 mm in width and 0.62 mm in thickness, and the dielectric layer per layer faces an electrode in an area of 2.5 $mm^2$ and 200 dielectric layers were stacked effectively.

[Assessment of Samples]

For each of sample Nos. 1-19, a value of Zn(2)/Zn(1) was obtained to evaluate an amount of Zn volatilized.

Furthermore, for each of Sample Nos. 1 to 19, a high-temperature load test was conducted to determine a mean time to failure.

That is, a DC voltage of 20 V was applied to 10 pieces of each sample at 175° C., and any sample having insulation resistance dropping to 10 kΩ or lower was determined to be defective, and a Weibull plot was used to obtain a time to failure for 50% on Weibull probability paper, i.e., a mean time to failure. Any sample having a mean time to failure of 250 hours or less was determined to be out of specification.

Table 2 shows the compositions, Zn(2)/Zn(1) values, and mean times to failure of sample Nos. 1 to 19 after being fired.

TABLE 2

| sample Nos. | Ba/Ti ratio (-) | Zn(2)/Zn(1) | main component Zn(2) | Mg | Gd | Dy | Y | Mg | Al | Mn | Cu | V | Zn | Si | mean time to failure (h) |
|---|---|---|---|---|---|---|---|---|---|---|---|---|---|---|---|
| | | | | | | | sub component | | | | | | | | |
| 1* | 0.98 | 0.10 | 0.015 | 0.0 | — | — | — | — | — | 0.50 | — | — | — | 1.0 | 4 |
| 2 | 1.00 | 0.11 | 0.016 | 0.0 | — | — | — | — | — | 1.2 | — | — | — | 1.0 | 300 |
| 3 | 1.02 | 0.07 | 0.011 | 0.0 | — | — | — | — | — | 1.2 | — | — | — | 1.0 | 510 |
| 4 | 1.04 | 0.08 | 0.012 | 0.0 | — | — | — | — | — | 1.2 | — | — | — | 1.0 | 390 |
| 5* | 1.06 | 0.11 | 0.017 | 0.0 | — | — | — | — | — | 1.2 | — | — | — | 1.0 | — |
| 6* | 1.01 | 0.00 | 0.0 | 0.0 | — | — | — | — | — | 0.75 | — | — | — | 1.0 | 20 |
| 7 | 1.01 | 0.07 | 0.010 | 0.0 | — | — | — | — | — | 0.75 | — | — | — | 1.0 | 430 |
| 8 | 1.01 | 0.19 | 0.084 | 0.0 | — | — | — | — | — | 0.75 | — | — | — | 1.0 | 540 |
| 9 | 1.01 | 0.13 | 0.13 | 0.0 | — | — | — | — | — | 1.0 | — | — | — | 1.0 | 290 |
| 10* | 1.01 | 0.22 | 0.44 | 0.0 | — | — | — | — | — | 1.0 | — | — | — | 1.0 | 20 |
| 11* | 1.01 | 0.00 | 0.0 | 0.45 | — | — | — | — | — | 1.0 | — | — | — | 1.0 | less than 1 hour |
| 12 | 1.01 | 0.22 | 0.043 | 0.0 | 0.50 | — | — | 0.50 | — | — | — | — | — | — | 780 |
| 13 | 1.01 | 0.21 | 0.042 | 0.0 | — | 1.00 | — | 0.50 | — | — | — | — | — | — | 650 |
| 14 | 1.01 | 0.20 | 0.060 | 0.0 | — | — | 1.00 | 0.50 | — | — | — | — | — | — | 480 |
| 15 | 1.02 | 0.21 | 0.062 | 0.0 | — | — | — | — | — | 1.0 | 0.10 | — | — | 1.5 | 470 |
| 16 | 1.02 | 0.21 | 0.063 | 0.0 | — | — | — | — | — | 1.0 | — | 0.10 | — | 1.5 | 590 |
| 17 | 1.02 | 0.14 | 0.021 | 0.0 | — | — | 0.50 | — | 0.30 | 1.0 | — | — | — | 2.0 | 660 |
| 18 | 1.01 | 0.17 | 0.025 | 0.0 | 0.50 | — | — | — | — | 1.0 | — | — | — | 2.0 | 710 |
| 19* | 1.01 | 0.00 | 0.0 | 0.0 | — | — | — | — | — | 0.50 | — | — | 0.0 | 1.0 | 5 |

*departing from the scope of the present invention

Content relative to 100 parts by mol of Ti (in parts by mol)

Sample No. 1 had as short a mean time to failure as 4 hours. This is because the sample had a Ba/Ti ratio of 0.98 and contained a main element at a B site, or Ti, excessively in molar amount, and thus presented insulation performance impaired in a short time. It is believed that this is because the sample contained Ti excessively in molar amount and accordingly, did not allow a B-site vacancy to be easily formed, and thus did not have an oxygen defect diffusion suppressing effect.

Sample No. 5 had a Ba/Ti ratio of 1.06 and thus excessively contained Ba in molar amount, and was accordingly inferior in sinterability and unable to provide a dense sintered compact.

Sample No. 6 presented significant degradation of insulation performance over time and had as short a mean time to failure as 20 hours. It is believed that this is because the sample did not contain the volatile element, or Zn, in the ceramic raw material powder, and accordingly, never formed a B-site vacancy, and accordingly, had migration and diffusion of an oxygen defect formed in a crystal grain through the firing treatment.

Sample No. 10, although containing Zn in the main component, had as short a mean time to failure as 20 hours and was thus unable to provide sufficient reliability. It is believed that this is because the sample contained Zn in a molar amount of 0.44 parts by mol with respect to 100 parts by mol of Ti and thus had Zn remaining in a large amount and accordingly, was unable to form a desired B-site vacancy.

Sample No. 11 contained Mg, rather than Zn, in the main component, and accordingly, had a mean time to failure less than 1 hour. It is believed that this is because Mg is not a volatile element and thus never volatilized in the firing treatment, and accordingly, the sample was unable to suppress diffusion of an oxygen defect formed in a crystal grain.

Sample No. 19 had as short a mean time to failure as 5 hours. It is believed that this is because the sample did not have a solid solution of Zn in the main component and instead contained Zn as a sub component, and accordingly, while Zn is volatilized through the firing treatment, Zn did not contribute to forming a B-site vacancy, and accordingly, the sample was unable to suppress oxygen defect diffusion.

In contrast, Sample Nos. 2 to 4, 7 to 9, and 12 to 18 each had a main component with Zn contained therein in a molar amount larger than 0 part by mol and less than or equal to 0.2 part by mol with respect to 100 parts by mol of Ti, and a Ba/Ti ratio of 1.00 or more and 1.04 or less, both of which fall within the scope of the present invention, and it has been found that the samples were able to suppress degradation of insulation resistance over time and had a satisfactory mean time to failure of 290-780 hours and hence satisfactory reliability. It is believed that this is because Zn was volatilized and accordingly, a desired B-site vacancy was formed.

Further, it has been found that a rare earth element, a transition metal element, and $SiO_2$ added as a sub component in an appropriate amount do not affect reliability.

Furthermore, the samples in the scope of the present invention also had a Zn(2)/Zn(1) value of 0.22 or less and within the range of 0.4 or less.

Example 2

[Preparing Samples]
(Sample Nos. 21-25)

For each sample, $BaCO_3$, $TiO_2$ and ZnO were prepared as ceramic raw materials and weighed such that after the weighed materials had been synthesized, Zn in parts by mol with respect to 100 parts by mol of Ti, and a Ba/Ti ratio had values as shown in Table 3, and the weighed materials were calcined in a manner and procedure similar to those in example 1 at 900 to 1100° C. in the air to produce a main component powder.

Subsequently, as sub component powders, $Gd_2O_3$, MgO, $MnCO_3$, and $SiO_2$ were prepared. Subsequently, these sub component powders were weighed to have values in parts by mol, as shown in Table 3, with respect to 100 parts by mol of Ti, and a method and procedure similar to those in example 1 were employed to produce ceramic raw material powders for sample Nos. 21-25.

Subsequently, a method and procedure similar to those in example 1 were employed to produce a multilayer shaped body, which was in turn heated in the air at 350° C. for 3 hours to remove the binder therefrom, and furthermore, fired at 1200° C. for 2 hours in a reducing atmosphere of gaseous $H_2$—$N_2$—$H_2O$ with an oxygen partial pressure controlled to be $10^{-9}$ to $10^{-10}$ MPa to co-sinter a conductive film and a ceramic green sheet to provide a ceramic sintered compact having dielectric layers and internal electrodes deposited alternately.

The ceramic sintered compacts of Sample Nos. 21 to 25 were subjected to a structural analysis in an XRD method (X-ray diffraction method), and it has been confirmed that the ceramic sintered compacts all had a barium titanate-based perovskite type crystal structure.

The ceramic sintered compacts of Sample Nos. 21 to 25 were dissolved and analyzed through ICP-AES, and it has been found that although the component of Zn after fired was reduced from that when the main component was synthesized, the component of Zn remained in a large amount. It is believed that this is because, from a relationship of equilibrium oxygen partial pressure of Zn—ZnO, it is difficult to produce metal Zn with an oxygen partial pressure of about $10^{-9}$ to $10^{-10}$ MPa, and the samples were unable to form a sufficient B-site vacancy. Note that the sub component's content in molar amount was substantially unvaried between before and after the firing.

Subsequently, a method and procedure similar to those in example 1 were employed to form external electrodes on opposite end surfaces of the ceramic sintered compacts to produce sample Nos. 21-25.

(Sample Nos. 26-28)

For each sample, $BaCO_3$, $TiO_2$ and ZnO were prepared as ceramic raw materials and weighed such that after the weighed materials had been synthesized, Zn in parts by mol with respect to 100 parts by mol of Ti, and a Ba/Ti ratio had values as shown in Table 3. Subsequently, these weighed materials were charged into a ball mill together with PSZ balls and pure water, sufficiently wet-mixed and thus ground, and dried, and thereafter calcined at 1000° C. for about 2 hours in the air to produce a main component powder.

The main component powder was subjected to a heat treatment for 2 hours in a reducing atmosphere of gaseous $N_2$—$H_2$ with $H_2$'s volumetric content adjusted to 3 vol % to thus produce a heat-treated powder.

Subsequently, as sub component powders, $Gd_2O_3$, MgO, $MnCO_3$, and $SiO_2$ were prepared. Subsequently, these sub component powders were weighed to have values in parts by mol, as shown in Table 3, with respect to 100 parts by mol of Ti, and a method and procedure similar to those in example 1 were employed to produce ceramic raw material powders for sample Nos. 26-28.

The ceramic raw material powder of each of Sample Nos. 26 to 28 was analyzed through ICP-AES, and it has been confirmed that Zn in the heat-treated powder was reduced from that when the main component was synthesized, and that Zn has been volatilized in the heat treatment. Note that the sub component was contained in a molar amount substantially equal to that charged.

Subsequently, a method and procedure similar to those in example 1 were employed to produce a multilayer shaped body, which was in turn heated in the air at 350° C. for 3 hours to remove the binder therefrom, and furthermore, fired at 1250° C. at maximum for 2 hours in a reducing atmosphere of gaseous $H_2$—$N_2$—$H_2O$ with an oxygen partial pressure controlled to be $10^{-9}$ to $10^{-10}$ MPa to co-sinter a conductive film and a ceramic green sheet to provide a ceramic sintered compact having dielectric layers and internal electrodes deposited alternately.

The ceramic sintered compacts of Sample Nos. 26 to 28 were subjected to a structural analysis in an XRF method, and it has been confirmed that the ceramic sintered compacts all had a barium titanate-based perovskite type crystal structure.

The ceramic sintered compacts of Sample Nos. 26 to 28 were dissolved and analyzed through ICP-AES, and it has been confirmed that Zn after fired was substantially identical to Zn in the heat-treated powder and that Zn is not volatilized even when a firing treatment is performed in a reducing atmosphere with an oxygen partial pressure of $10^{-9}$ to $10^{-10}$ MPa. Note that the sub component's content in molar amount was substantially unvaried between before and after the firing.

Subsequently, a method and procedure similar to those in example 1 were employed to form external electrodes on opposite end surfaces of the ceramic sintered compacts to produce sample Nos. 26-28.

[Assessment of Samples]

For each of sample Nos. 21-28, a value of $Zn(2)/Zn(1)$ was obtained to evaluate an amount of Zn volatilized. Note that in Example 2, a Zn content after the main component powder is synthesized is indicated as $Zn(1)$, and a Zn content in the main component after the heat treatment is indicated as $Zn(2)$.

Furthermore, for each of Sample Nos. 21-28, a method and procedure similar to those in example 1 were employed to conduct a high-temperature load test to determine a mean time to failure.

Table 3 shows the component compositions, $Zn(2)/Zn(1)$ values, and mean times to failure of sample Nos. 21-28.

atmosphere for Zn, and metal Zn could not be generated or volatilized, and accordingly, the component of Zn remained in a large amount and an oxygen defect diffusion suppressing effect could not be sufficiently exhibited, resulting in a short mean time to failure.

In particular, Sample No. 24 provided a ceramic sintered compact having with respect to 100 parts by mol of Ti a Zn content of 0.35 parts by mol, which exceeds 0.20 parts by mol, and accordingly, presented a short mean time to failure while having a $Zn(2)/Zn(1)$ value of 0.4 or less.

In contrast, sample Nos. 26 to 28 after sintered had a main component with a Zn content of 0.092 to 0.12 parts by mol with respect to 100 parts by mol of Ti, and a Ba/Ti ratio of 1.01 to 1.03, both of which fall within the scope of the present invention, and accordingly, presented a mean time to failure of 290-390 hours and thus obtained satisfactory reliability. That is, it has been found that in a case with a main component powder produced through calcination and thereafter subjected to a heat treatment in a reducing atmosphere to volatilize Zn, even when subsequently a firing treatment is performed in a weakly reducing atmosphere a desired high-temperature load lifetime can be obtained.

Example 3

[Preparing Samples]

$BaCO_3$, $TiO_2$, $ZrO_2$ and ZnO were prepared as ceramic raw materials and weighed such that after the weighed materials had been synthesized, Zn and Zr in parts by mol with respect to 100 parts by mol of a total of Ti and Zr, and a molar ratio of Ba to the total of Ti and Zr (hereinafter referred to as a "Ba/(Ti+Zr) ratio") had values as shown in Table 4. Subsequently, these weighed materials were charged into a ball mill together with PSZ balls and pure water, sufficiently wet-mixed and thus ground, and dried, and thereafter calcined at 1050° C. for about 2 hours in the air to produce a main component powder.

Subsequently, as sub component powders, $MnCO_3$ and $SiO_2$ were prepared. Subsequently, these sub component powders were weighed to be contained in amounts in parts by mol, as indicated in Table 4, with respect to 100 parts by mol of a total of Ti and Zr, and wet-mixed in a ball mill and thereafter dried to obtain ceramic raw material powders for sample Nos. 31-33.

TABLE 3

| | | | Content relative to 100 parts by mol of Ti (in parts by mol) | | | | | | |
|---|---|---|---|---|---|---|---|---|---|
| | | | main component | | | | | | mean |
| sample Nos. | Ba/Ti ratio (-) | Zn(2)/Zn(1) | after synthesis Zn(1) | after heat treatment Zn(2) | Gd | sub component Mg | Mn | Si | time to failure (h) |
| 21* | 1.03 | 0.51 | 1.0 | 0.51 | 0.20 | 0.20 | 0.50 | 1.0 | 30 |
| 22* | 1.01 | 0.43 | 1.0 | 0.43 | — | — | 0.50 | 1.0 | less than 1 hour |
| 23* | 1.02 | 0.66 | 1.0 | 0.66 | — | — | 1.0 | 1.0 | 10 |
| 24* | 1.02 | 0.35 | 1.0 | 0.35 | — | — | 0.30 | 1.0 | less than 1 hour |
| 25* | 1.02 | 0.55 | 1.0 | 0.55 | — | — | 0.30 | 1.0 | less than 1 hour |
| 26 | 1.03 | 0.11 | 1.0 | 0.11 | 0.20 | 0.20 | 0.50 | 1.0 | 390 |
| 27 | 1.01 | 0.09 | 1.0 | 0.092 | — | — | 0.50 | 1.0 | 340 |
| 28 | 1.02 | 0.12 | 1.0 | 0.12 | — | — | 1.0 | 1.0 | 290 |

*departing from the scope of the present invention

Sample Nos. 21 to 25 provided ceramic sintered compacts having with respect to 100 parts by mol of Ti a Zn content of 0.35 to 0.66 parts by mol, which exceeds 0.20 parts by mol, and accordingly, presented as short a mean time to failure as 30 hours or less. It is believed that this is because while the firing treatment was performed in a reducing atmosphere, the atmosphere had an oxygen partial pressure of $10^{-9}$ to $10^{-10}$ MPa and was thus a weakly reducing The ceramic raw material powders of Sample Nos. 31 to 33 had their compositions analyzed through ICP-AES and XRF, and it has been found that each ceramic raw material powder had Zn and Zr contents, a Ba/(Ti+Zr) ratio, and a sub component substantially equal/identical to the amount charged. Note that the sub component's content in molar amount was substantially unvaried between before and after the firing.

Subsequently, a method and procedure similar to those in example 1 were employed to produce ceramic sintered compacts of sample Nos. 31-33.

The ceramic sintered compacts of Sample Nos. 31 to 33 were subjected to a structural analysis in an XRD method (X-ray diffraction method), and it has been confirmed that the ceramic sintered compacts all had a barium titanate-based perovskite type crystal structure.

The ceramic sintered compacts of Sample Nos. 31 to 33 were dissolved and analyzed through ICP-AES, and it has been confirmed that Zn after sintered was reduced from that when the main component was synthesized, and that Zn has been volatilized in the firing treatment.

Subsequently, a method and procedure similar to those in example 1 were employed to form external electrodes on opposite end surfaces of the ceramic sintered compacts to produce sample Nos. 31-33.

[Assessment of Samples]

For each of sample Nos. 31-33, a value of $Zn(2)/Zn(1)$ was obtained to evaluate an amount of Zn volatilized. Note that in Example 3 also, a Zn content in a main component after the synthesis is indicated as $Zn(1)$, and a Zn content in the main component after fired is indicated as $Zn(2)$.

Furthermore, for each of Sample Nos. 31-33, a method and procedure similar to those in example 1 were employed to conduct a high-temperature load test to determine a mean time to failure.

Table 4 shows the component compositions and mean times to failure of sample Nos. 31-33.

TABLE 4

| sample Nos. | Ba/(Ti + Zr) ratio (-) | Zn(2)/Zn(1) | main component after synthesis | | main component after fired | | sub component | | mean time to failure (h) |
|---|---|---|---|---|---|---|---|---|---|
| | | | Zn(1) | Zr | Zn(2) | Zr | Mn | Si | |
| 31 | 1.02 | 0.22 | 0.2 | 20 | 0.044 | 20 | 1.0 | 1.0 | 450 |
| 32 | 1.02 | 0.26 | 0.2 | 40 | 0.052 | 40 | 1.0 | 1.0 | 590 |
| 33 | 1.02 | 0.37 | 0.2 | 60 | 0.073 | 60 | 1.0 | 1.0 | 730 | content relative to 100 parts by mol of total of Ti & Zr (in parts by mol)

While Sample Nos. 31 to 33 have Zr contained at a B site in a range of 20 to 60 parts by mol with respect to 100 parts by mole of a total of Ti and Zr, it has been found that the samples after fired have Zn in an amount of 0.044 to 0.073 parts by mol with respect to 100 parts by mole of the total of Ti and Zr, which falls within the scope of the present invention, and also had a Ba/(Ti+Zr) ratio of 1.02, which falls within the scope of the present invention, and accordingly, the samples present a mean time to failure of 450-730 hours and hence have high reliability. That is, it has been confirmed that even if a B site contains not only Ti and a volatile element but also Zr, a multilayer ceramic capacitor having a satisfactory high-temperature load lifetime and hence high reliability can be obtained in so far as the Ba/(Ti+Zr) ratio and the volatile element's content fall within the scope of the present invention.

As described herein, a dielectric porcelain composition and a multilayer ceramic capacitor can be implemented that have a satisfactory high-temperature load lifetime and hence a high reliability even in a case of continuous driving for a long period of time in a high-temperature atmosphere.

REFERENCE SIGNS LIST

1: ceramic sintered compact
2a-2f: internal electrode
6a-6g: dielectric layer

The invention claimed is:

1. A method for producing a multilayer ceramic capacitor, the method comprising:

preparing a ceramic raw material at least including a Ti compound and a compound containing a volatile element;

calcining the ceramic raw material in air to synthesize a perovskite compound having a formula of $ABO_3$, with the volatile element forming a solid solution at the B site of the perovskite compound, to form a main component powder;

preparing a ceramic slurry from the main component powder;

shaping the ceramic slurry to produce a ceramic green sheet;

using a conductive paste containing a base metal material as a main component to form a conductive film of a prescribed pattern on the ceramic green sheet;

stacking a plurality of the ceramic green sheets each having the conductive film formed thereon to produce a multilayer shaped body;

firing the multilayer shaped body in a reducing atmosphere to produce a ceramic sintered compact such that the ceramic sintered compact has a main component containing the volatile element in an amount larger than 0 part by mol and less than or equal to 0.2 part by mol with respect to 100 parts by mol of a total of the Ti, and a ratio of an A-site element to the total of the Ti is 1.00 or more and 1.04 or less as a molar ratio; and subjecting the main component powder to a heat treatment in a reducing atmosphere, wherein the heat treatment is performed before the firing is performed.

2. The method for producing a multilayer ceramic capacitor according to claim 1, wherein the ceramic raw material further includes a Zr compound, and the ceramic sintered compact has the main component containing the volatile element in an amount larger than 0 part by mol and less than or equal to 0.2 part by mol with respect to 100 parts by mol of a total of the Ti and the Zr, and a ratio of an A-site element to the total of the Ti and the Zr is 1.00 or more and 1.04 or less as a molar ratio.

3. The method for producing a multilayer ceramic capacitor according to claim 1, wherein a ratio of the volatile element in the main component of the ceramic sintered compact to the volatile element in the main component powder is 0.4 or less as a molar ratio.

4. The method for producing a multilayer ceramic capacitor according to claim 1, wherein the reducing atmosphere has an oxygen partial pressure of $10^{-11}$ to $10^{-14}$ MPa.

5. The method for producing a multilayer ceramic capacitor according to claim 1, wherein the volatile element includes at least one selected from Zn, Sn, Sb, and In.

6. The method for producing a multilayer ceramic capacitor according to claim 1, wherein the A-site element includes at least one selected from Ba, Ca and Sr.

7. The method for producing a multilayer ceramic capacitor according to claim 1, further comprising adding a sub component to the main component powder and preparing the ceramic slurry from the main component powder and the sub component.

8. The method for producing a multilayer ceramic capacitor according to claim 7, wherein the sub component includes at least one of a rare earth compound, a transition metal compound, and a Si compound.

9. The method for producing a multilayer ceramic capacitor according to claim 8, wherein the sub component is the rare earth element, and the rare earth element is at least one selected from Gd, Dy, and Y.

10. The method for producing a multilayer ceramic capacitor according to claim 8, wherein the sub component is the transition metal element, and the transition metal element is at least one selected from Mg, Al, Mn, Cu, and V.

* * * * *